United States Patent
Bathiche et al.

(10) Patent No.: US 7,471,284 B2
(45) Date of Patent: Dec. 30, 2008

(54) TACTILE SCROLL BAR WITH ILLUMINATED DOCUMENT POSITION INDICATOR

(75) Inventors: Steven N. Bathiche, Kirkland, WA (US); Francois Victor Jacques Jérome Guimbretière, Baltimore, MD (US); Gian Pangaro, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 11/106,682

(22) Filed: Apr. 15, 2005

(65) Prior Publication Data
US 2006/0236262 A1   Oct. 19, 2006

(51) Int. Cl.
G06F 3/033 (2006.01)
(52) U.S. Cl. ........................ 345/184; 345/156
(58) Field of Classification Search ................. 345/156, 345/168, 170, 184
See application file for complete search history.

(56) References Cited

U.S. PATENT DOCUMENTS

| | | | | |
|---|---|---|---|---|
| 4,608,967 A * | 9/1986 | Piro | | 601/107 |
| 5,805,146 A * | 9/1998 | Jaeger et al. | | 345/172 |
| 6,043,809 A * | 3/2000 | Holehan | | 345/168 |
| 6,163,280 A * | 12/2000 | Breider | | 341/21 |
| 6,300,938 B1 * | 10/2001 | Culver | | 345/156 |
| 2003/0107603 A1 * | 6/2003 | Clapper | | 345/784 |
| 2005/0062732 A1 * | 3/2005 | Sinclair et al. | | 345/184 |

FOREIGN PATENT DOCUMENTS

JP           55114909 A  *  9/1980

* cited by examiner

Primary Examiner—Richard Hjerpe
Assistant Examiner—Christopher E Leiby
(74) Attorney, Agent, or Firm—Merchant & Gould

(57) ABSTRACT

A tactile touch-sensitive device for use as an electronic input device for indicating a position of an electronic document on a display device is described. The illuminable document position indicator aspect of the device provides a relative location of the electronic document on the display. The device may be included as part of a keyboard or an electronic book device. The illuminable document position indicator may be one or more static illuminable LEDs and/or a moveable light source and pivotable translucent elements which act as light wave guides. A controller may be used to control the illuminable document position indicator. The controller may change the color and/or intensity of LEDs based upon a displayed location of the electronic document relative to a beginning and an end of the electronic document.

19 Claims, 14 Drawing Sheets

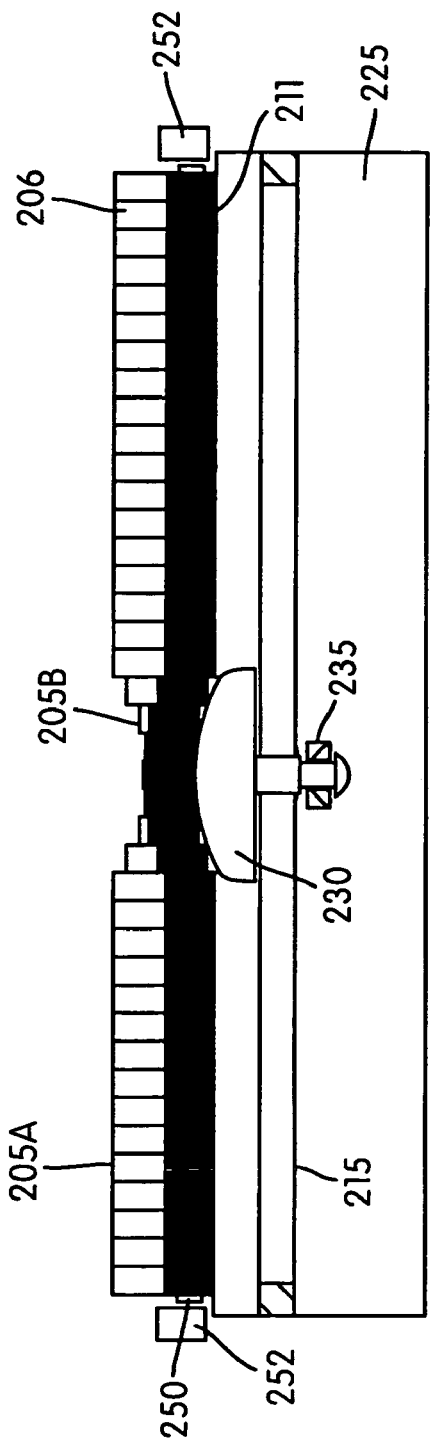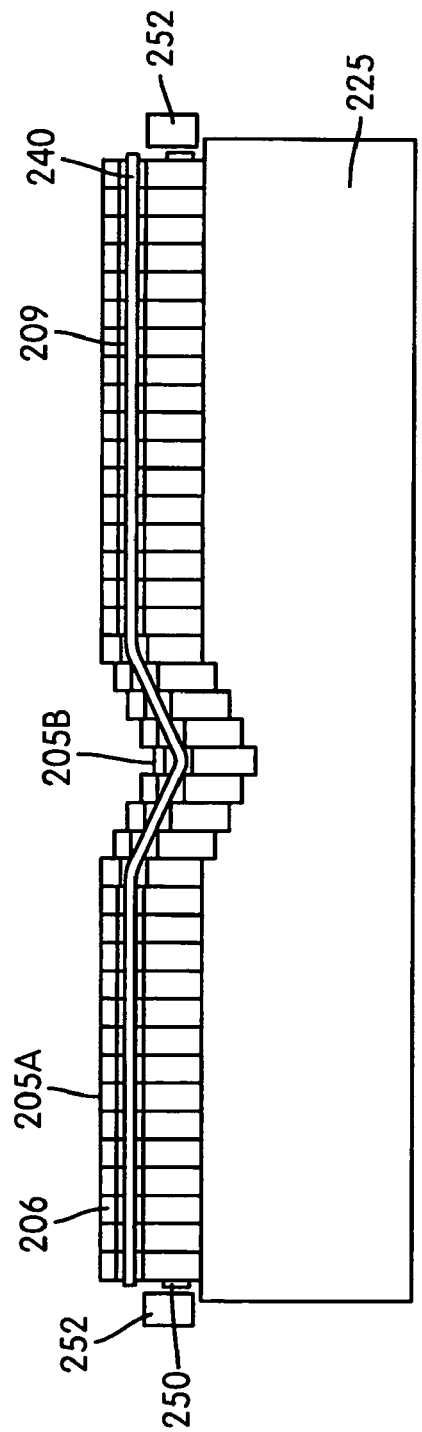

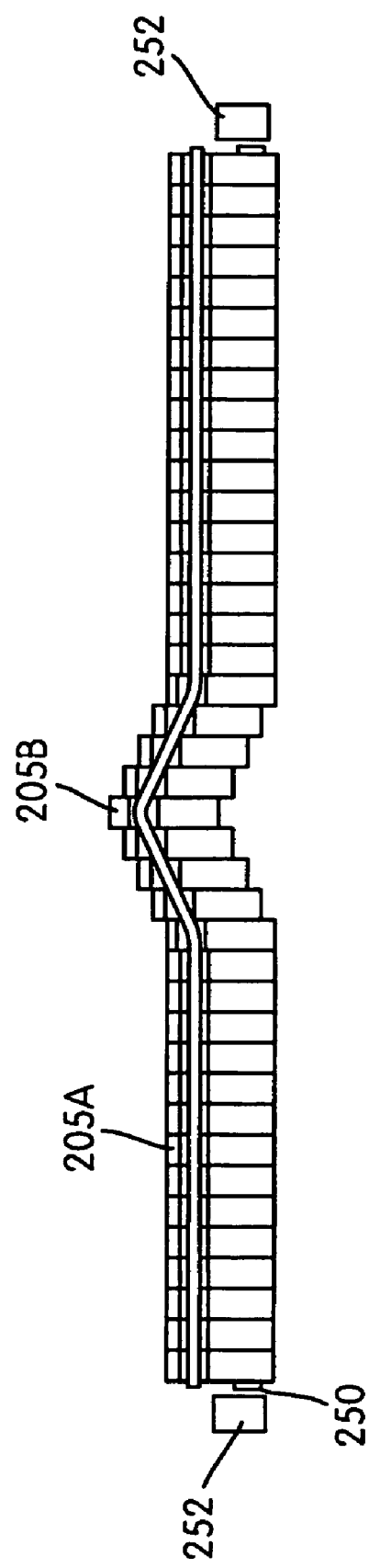

TACTILE SCROLL BAR WITH ILLUMINATED DOCUMENT POSITION INDICATOR

FIELD OF THE INVENTION

The present invention relates to a scrolling device for navigating digital documents. More specifically, the present invention relates to a tactile scrollbar that provides feedback illumination to facilitate scrolling and flipping through digital documents.

DESCRIPTION OF RELATED ART

The widespread use of computers and computing technologies has engendered a movement from paper and physical documents to electronic versions of those materials. While physical versions of documents are still readily available, many have found the portability and accessibility of digital documents more appealing and convenient. However, one significant disadvantage of reading and accessing digital documents is navigation. The physical component and interaction of flipping a page or marking a certain place in the book allows a degree of control that has been unmatched in digital documents. For example, unlike a physical book or paper, there is no physical indication of where a reader is in the document. As such, a digital document reader must often make mental calculations or notes to navigate the document effectively. Additionally, while a reader is able to easily flip from page to page or in larger sections within a physical document, navigation of electronic copies is not nearly as flexible. Finally, some readers simply enjoy and find comfort in the physical aspects of document navigation.

Users of electronic documents currently have some choices in the way of scrolling and navigating through e-documents. For instance, some programs use a graphical user interface virtual scrollbar along the side of the document for navigation purposes. Users may use a cursor control device, such as a computer mouse, to click and drag an indicator to scroll through the document or click on a specific location on the scrollbar causing a jump to the corresponding area in the document. As discussed above, such an approach lacks the physical component in navigating through a document. Users must visually determine their current location in the document and therefore draw their attention away from their reading and/or other working. Moreover, virtual scrollbar navigation is often imprecise and may cause users to expend significant amounts of time and fine mouse control to arrive at their intended location. In addition, overlapping documents may obscure the virtual scrollbar of a given document and require the user to manipulate windows just to navigate through a document.

Another variation is integrated scroll buttons or rotatable wheels on keyboards or other input devices. In such a device, a user may press an up or down button or rotate a wheel to cause scrolling of the document in a desired direction. Such arrangements typically lack any indicator of the current location within a document and can be limited by scrolling inefficiencies due to having a single input element. For example, a rotatable wheel that is set to permit fine scrolling on a line-by-line basis may be inefficient when the user desires to scroll or otherwise move large distances in the document.

Touch-sensitive scroll strips have also been used to permit user manipulation of a document on a display screen. Such touch-sensitive scroll strips have been mounted on the top surface of a laptop. Such arrangements typically include an elongated contact area that uses capacitive-type touch-sensing technology to determine the location of a user's contact point on the contact surface. In combination with hardware or software controls, touch-sensitive scroll strips have permitted a user to move the document to an absolute location by touching and holding a specific location on the scroll strip for a predetermine period of time and/or for scrolling by using contact gestures such as by a combined tapping and flicking of the touch-sensitive scroll strip in a desired document moving location. While such an arrangement may allow a user to physically manipulate the electronic document, it may be difficult to control the scrolling because of inadequate feedback, as the feedback of the effects of manipulating existing scrollbars are mainly, if not entirely provided by the electronic document on the display.

Therefore, it would be advantageous for computers and other devices able to display electronic documents to include a physical input-output device that enhances tactile navigation of documents while providing tactile and/or visual indicators corresponding to document location.

BRIEF SUMMARY OF THE INVENTION

In view of the foregoing, an aspect of the invention provides a physical input-output device, such as a tactile scrollbar, for navigating an electronic document. The physical input-output device may be substantially contained within the housing of the computing or document display device and oriented in the direction of document flow. This permits a user to navigate and view a document on the same device and may further provide a physical correspondence between the tactile scrollbar and the displayed document. Additionally, such an implementation would facilitate traveling with electronic documents by eliminating the need to bring additional scrolling equipment (e.g., a mouse).

In one aspect, the tactile scrollbar provides the user with a system of navigation that corresponds to absolute movement. One implementation of such a system is by integrating a touch-sensitive interface in the tactile scrollbar. A user may move his or her finger along the interface to scroll quickly (or slowly, depending on the speed of movement) through the document. The digital document may be mapped such that the length of the touch-sensitive interface is representative of the length of the document.

In another aspect, the tactile scrollbar provides a tactile indicator for notifying the user of the current location within the document. This may be accomplished by using a raising or lowering mechanism underlying the scrollbar interface layer. The mechanism would be able to lower a particular section of the interface layer to produce a concave element. Alternatively, the mechanism could raise a section of the interface layer to produce a ridge. The location of the ridge or concave element relative to the length of the scrollbar would represent the current location in the document.

According to another aspect, the tactile scrollbar provides a mechanism that enables the user to finely scroll through a document (e.g., line by line). One implementation of such a mechanism may include pressure sensors at either end of the tactile scrollbar that is able to sense when a user applies force to a physical location indicator toward either of the two ends. The user may further control the speed of scrolling by applying less (slower scrolling) or more (faster scrolling) force.

Another aspect includes a user engageable device for scrolling an electronic document with respect to a display. The device includes a tactile elongated scrollbar and an illuminable document position indicator associated with the scrollbar.

In another aspect, a user engageable elongated scrollbar is used for scrolling an electronic document with respect to a display. The elongated scrollbar includes a tactile elongated scrollbar defining a longitudinal axis. It further includes structure for producing illumination positioned at least on one of the scrollbar or adjacent the scrollbar, so that the illumination generally corresponds to a relative position of the electronic document on the display.

In yet another aspect, a user engageable device is configured for scrolling an electronic document with respect to a display. The device includes a housing, an elongated scrollbar positioned on the housing, an illuminable document position indicator, and a controller configured to control the illuminable document position indicator.

These and other objects and features of the present invention will be apparent upon consideration of the following detailed description of preferred embodiments thereof, presented in connection with the following drawings in which like reference numerals identify like elements throughout.

BRIEF DESCRIPTION OF THE DRAWINGS

The present invention is illustrated by way of example and not limited in the accompanying figures in which like reference numerals indicate similar elements and in which:

FIG. 3A schematically illustrates an end view of the movable keys from the contour forming member side.

FIG. 3B schematically illustrates an end view of the movable keys from the user engageable scroll bar side.

FIG. 3C schematically illustrates an end view of the movable keys from the user engageable scroll bar side formed by an alternative key contour forming arrangement.

DETAILED DESCRIPTION OF THE INVENTION

Figure 1:
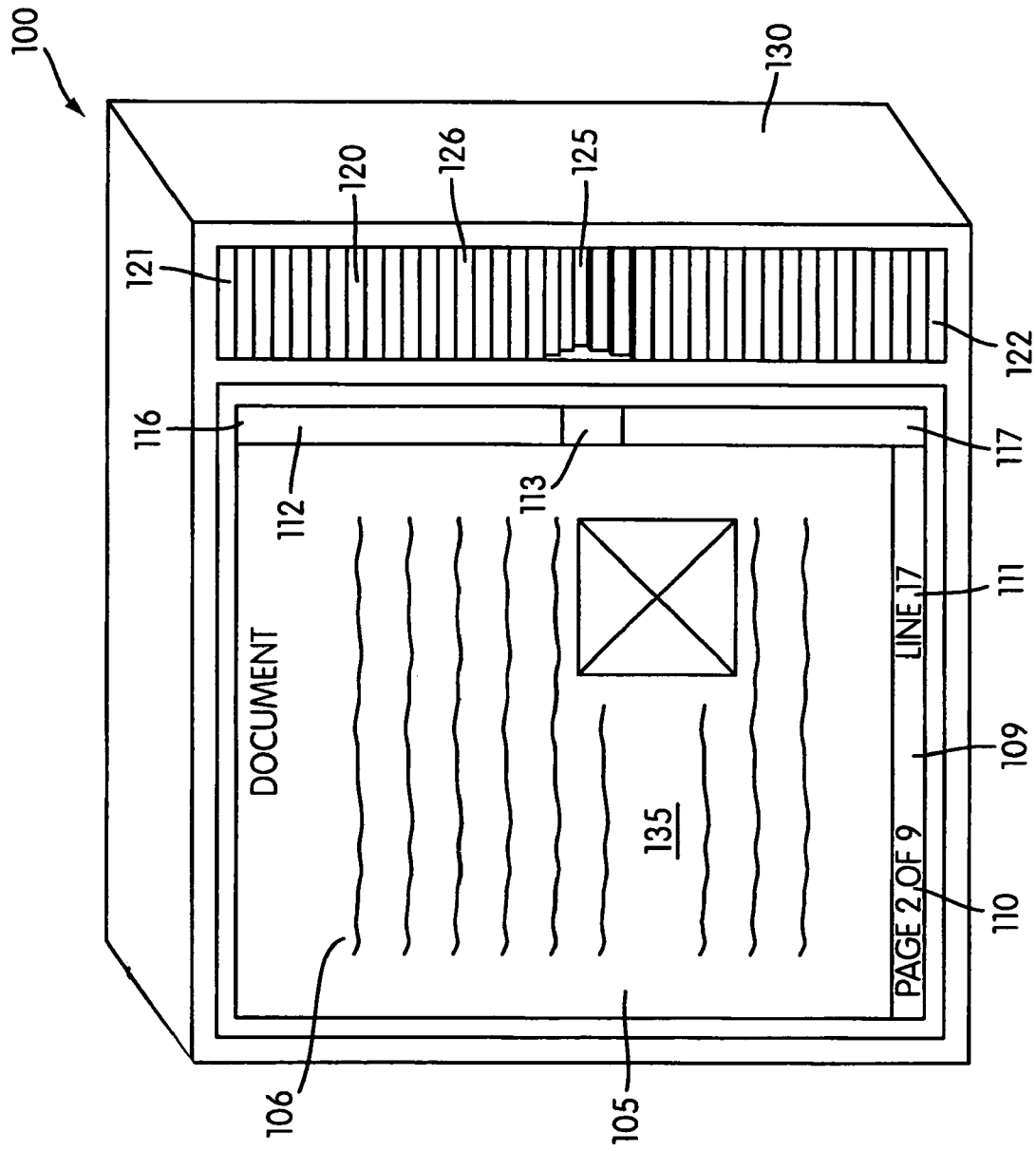
FIG. 1 is an illustrative example tactile scrollbar for document navigation according to one embodiment of the present invention shown on an electronic document viewing apparatus.
Figure 7A:
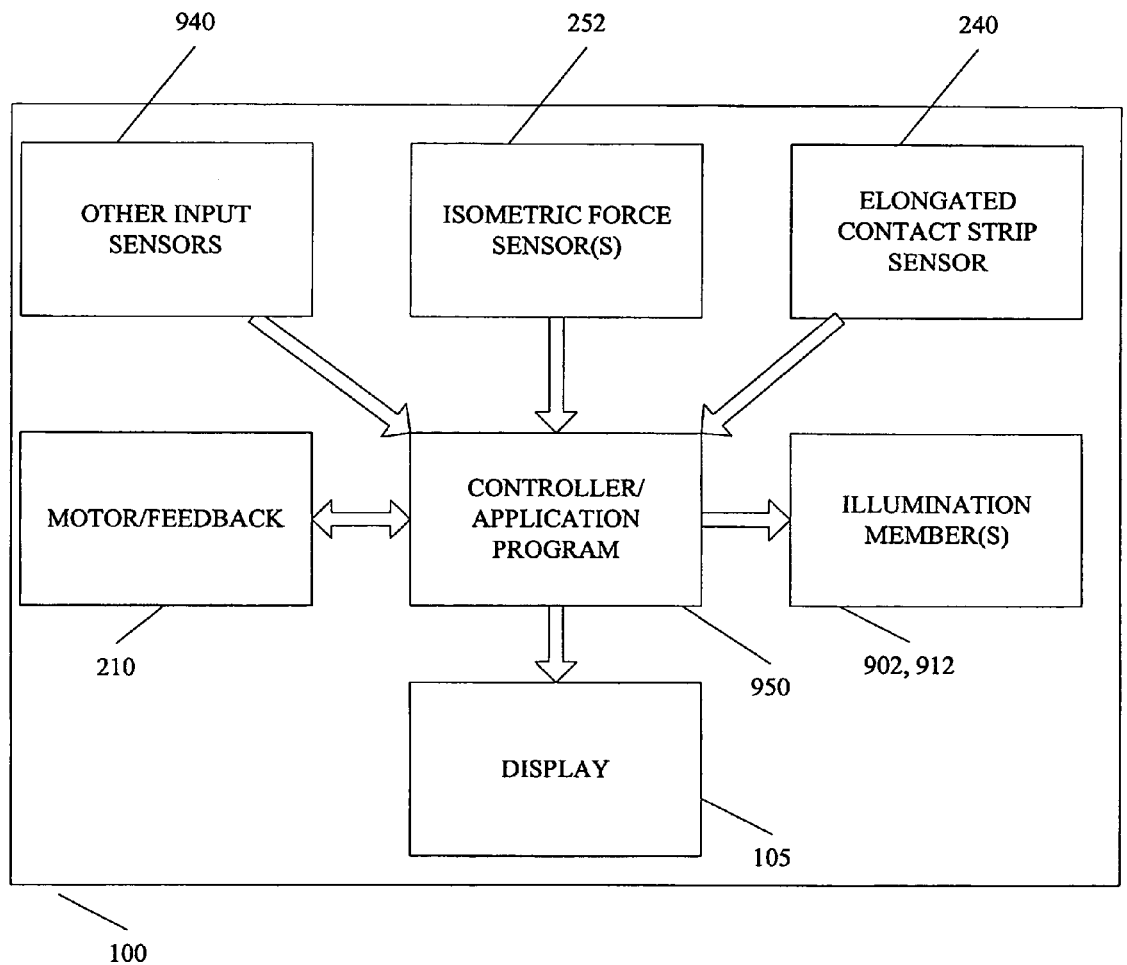
FIGS. 7A and 7B are a schematic block diagram showing the relationship between various system components.
Figure 7B:
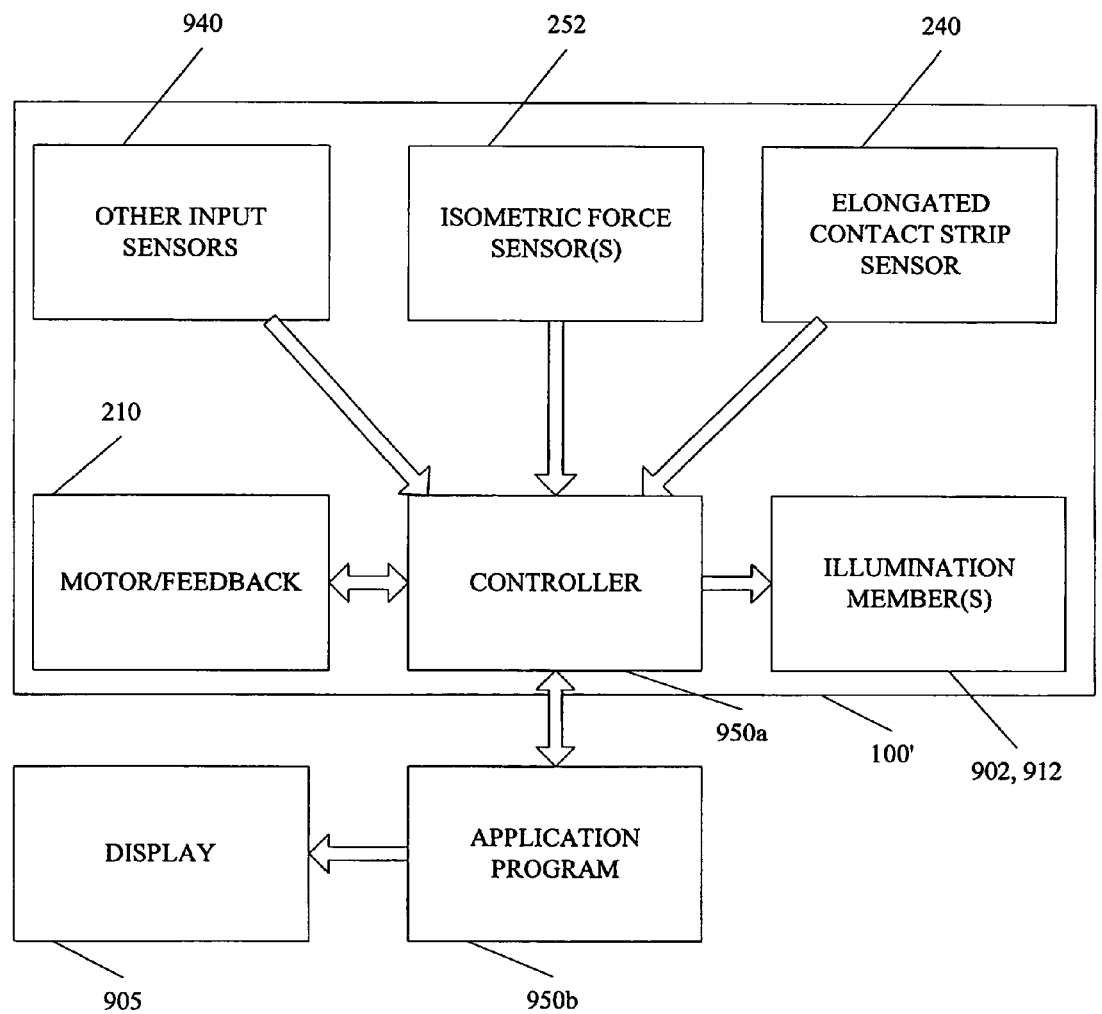
Figure 8:
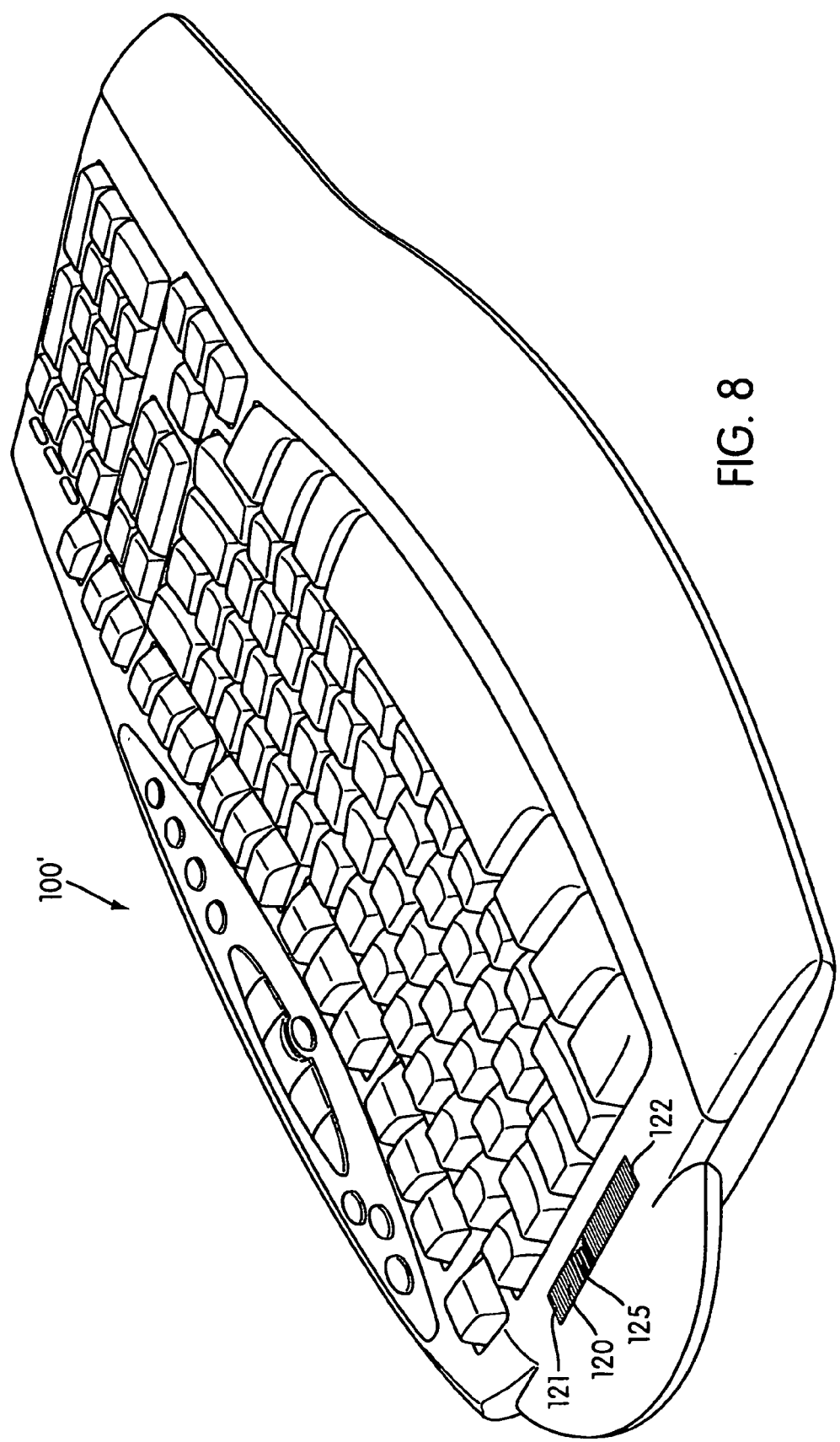
FIG. 8 is an illustrative example tactile scrollbar for document navigation according to one embodiment of the present invention shown on an electronic document viewing apparatus.

Several illustrative embodiments of tactile touch-sensitive scrolling and navigation systems are shown in FIGS. 1-10. These devices are capable of providing signals for manipulating a document, e.g., by scrolling, relative to a display device in one or more directions. While some of the different illustrated embodiments of scrolling systems are shown in isolation, aspects of the invention may also include the use of such touch-sensitive devices as part of a stand-alone input device, or in combination with other devices such as a personal digital assistant (PDA), an electronic tablet, a laptop computer, an internet appliance, an electronic book (E-Book), or on a keyboard or mouse input device. For example, FIG. 1 is an illustrative example of an electronic document viewing device, such as an E-Book device, providing a tactile scrollbar for navigation according to one embodiment of the tactile scrollbar of the present invention. For example, FIG. 8 shows a similar depiction of the tactile scrollbar incorporated into a computer input peripheral, specifically a keyboard. The terms "navigation" and "navigating" are generally used in the specification to describe moving a document relative to a display screen. Navigation of the document may include scrolling (e.g., horizontal scrolling, vertical scrolling), panning and combinations and subcombinations thereof.

One or more interfaces and/or driving circuitry/software may be utilized to provide communication between the scrolling device (e.g., scrollbar) and the computing system. The computing system may further include one or more of the following, which may be coupled together such as a keyboard and/or mouse, a processor such as a microprocessor and/or central processing unit, storage such as memory, a hard and/or diskette drive, and/or a display for displaying a document. The device for displaying the document may be any suitable device such as, but not limited to, a CRT screen, a LCD screen, a projector, or a heads-up display.

In further reference to FIG. 1, a tactile scrollbar device 120 is incorporated into a self-contained document viewing device 100 also having a housing 130 and display 105, such as an E-Book device. The E-Book device 100 includes a display 105. Illustrative for certain programs, such as various word processing programs, the display 105 may include a document display region 106, a region including vertical virtual scroll bar 112, and a region providing a numerical cursor location indicator 109. The document display region 105 may show an electric document 135. The electronic document 135 may be any desired documents, such as, but not limited to, text, images, spreadsheets, etc. that when viewed may be larger than just the region displayed. Thus, depending upon various conditions, the electronic document 135 may occupy the entire or a portion of the document display region 106.

Visual position indicators depicted within the display region 105 include numerical cursor location indicator 109, the vertical virtual scroll bar 112, and a horizontal virtual scroll bar (not shown) if the electronic document exceeds the width of the document shown in the document display region 106. The numerical cursor location indicator 109 providing an indication of the current location of the cursor in the form of a page indicator 110 and a line indicator 111.

The virtual scroll bars, such as vertical virtual scroll bar 112, graphically reflects the portion of the document in the document display region 106 relative to the entire electronic document 135 and is operated as is known in the art. For example, the virtual scroll bar 112 includes a virtual location indicator 113 that moves along an elongated virtual strip between a top 116 and a bottom 117. The position of the virtual location indicator 113 relative to the top 116 and bottom 117 corresponds to an absolute indicator of the viewed portion of the document as compared to the entire document. A user may move the up or down in the document by clicking on the virtual location indicator 113 and dragging, up or down, respectively, it to a different absolute position between the top 116 and the bottom 117. Alternatively, the user can place the cursor on the elongated virtual strip higher or lower than the virtual location indicator 113 and click an activating button, such as the primary button on a mouse, and the virtual location indicator 113 and the document will move to or toward the location of the cursor when clicked.

A tactile scrollbar generally refers to any of various touch-sensitive scrolling devices used to navigate an electronic document. Tactile scrollbar 120 may be positioned in a variety of locations on the housing 130. In one embodiment, tactile scrollbar 120 may be situated on an upper surface of the housing 130 of the device such that the length of the scrollbar 120, defined by longitudinal dimension of the scrollbar 120, is parallel to the axis of document flow (e.g., vertical scrolling). For example, document flow may refer to navigating a document from the head of the document to the foot of the document (multi-page documents would be represented with the foot of the first page followed by the head of the second page and so on). In addition and/or in lieu of the vertical scrolling tactile scrollbar 120, a horizontal scrolling tactile scrollbar (not shown) may be provided and it may be oriented transverse to the vertical scrolling tactile scrollbar 120 to enable horizontal scrolling (e.g., left to right and right to left) of the document.

The tactile scrollbar 120 includes an upper surface 126 that is exposed for contact by the user. As described hereinafter, the user can apply a force to the upper surface 126 to affect the scrolling of an electronic document in a number of manners. The tactile scrollbar 120 further includes a first end, e.g., top 121, a second end, e.g., bottom 122, and a changed contour region 125. The location of the changed contour region 125 relative to the ends 121 and 122 of the scrollbar 120 moves to generally correspond to the location of the viewed portion of electronic document 135 or the location of the cursor relative to the beginning (e.g., home) and end of the electronic document 135. In an illustrative arrangement, the changed contour region 125 forms a physical user interface contour that translates or otherwise moves in response to the location of the displayed portion of the document with respect to the entire document. It also functions to enable scrolling based on the application of an isometric force to the changed contour region 125, in addition to document manipulation based on absolute user touching of the scroll bar 120.

In one embodiment, the length of the scrollbar 120 is preferably mapped to the length of the document 135. Mapping relates to the correlation of particular locations in the document 135 to physical locations on the scrollbar 120. Preferably, the beginning of the document 135 is mapped to one end 121 of the scrollbar while the end of the document is mapped to the other end 122 of the scrollbar. In such a mapping, a user may determine his or her approximate location in the electronic document 135 by sensing the position of the changed contour region 125 relative to the longitudinal ends 121 and 122 of the tactile scrollbar 120. Changed contour region 125 may comprise additional components that may permit the user to navigate through the document 135 in a variety of modes. For example, one mode may permit a user to apply a force to the changed contour region 125 in the direction of desired document navigation to engage in fine scrolling.

Mapping of the electronic document 135 to the tactile scrollbar 120 may be achieved using conventional techniques and any such desirable technique may be used. For instance, equations and computer algorithms may be used to calculate discrete locations on the scrollbar that correspond to particular locations within the document. Depending on the length of the scrollbar 120, the length of the electronic document and the scrollbar's sensitivity to movement, adjacent positions on the scrollbar may represent a jump of several pages in the electronic document. For example, mapping a 10 page document to a scrollbar having a length of 5 inches and a sensitivity of 0.5 inches would result in the correspondence of each location on the scrollbar to a particular page in the document (5 inch scrollbar with a 0.5 inch sensitivity=10 scrollbar locations). However, if, instead, the document was 20 pages in the previous example, the positions on the scrollbar would correspond to every other page in the document. Additionally, users may elect to adjust the scrollbar sensitivity in the settings of the displaying device, which may also alter the mapping scheme.

FIGS. 2A through 3B schematically illustrate the tactile scrollbar 120 according to one embodiment of the present invention. The tactile scrollbar system may include the elements forming the exposed section of the tactile scrollbar 120, and a system for providing and moving the changed contour region 125. In one illustrative arrangement, 200, the tactile scrollbar 120 includes a plurality of movable keys 205 arranged side-by-side along the length of the scrollbar 120. In the depicted embodiment, the keys 205 are coupled together by a pivot bar 250 that extends through aligned holes in the keys 205.

Figure 2A:
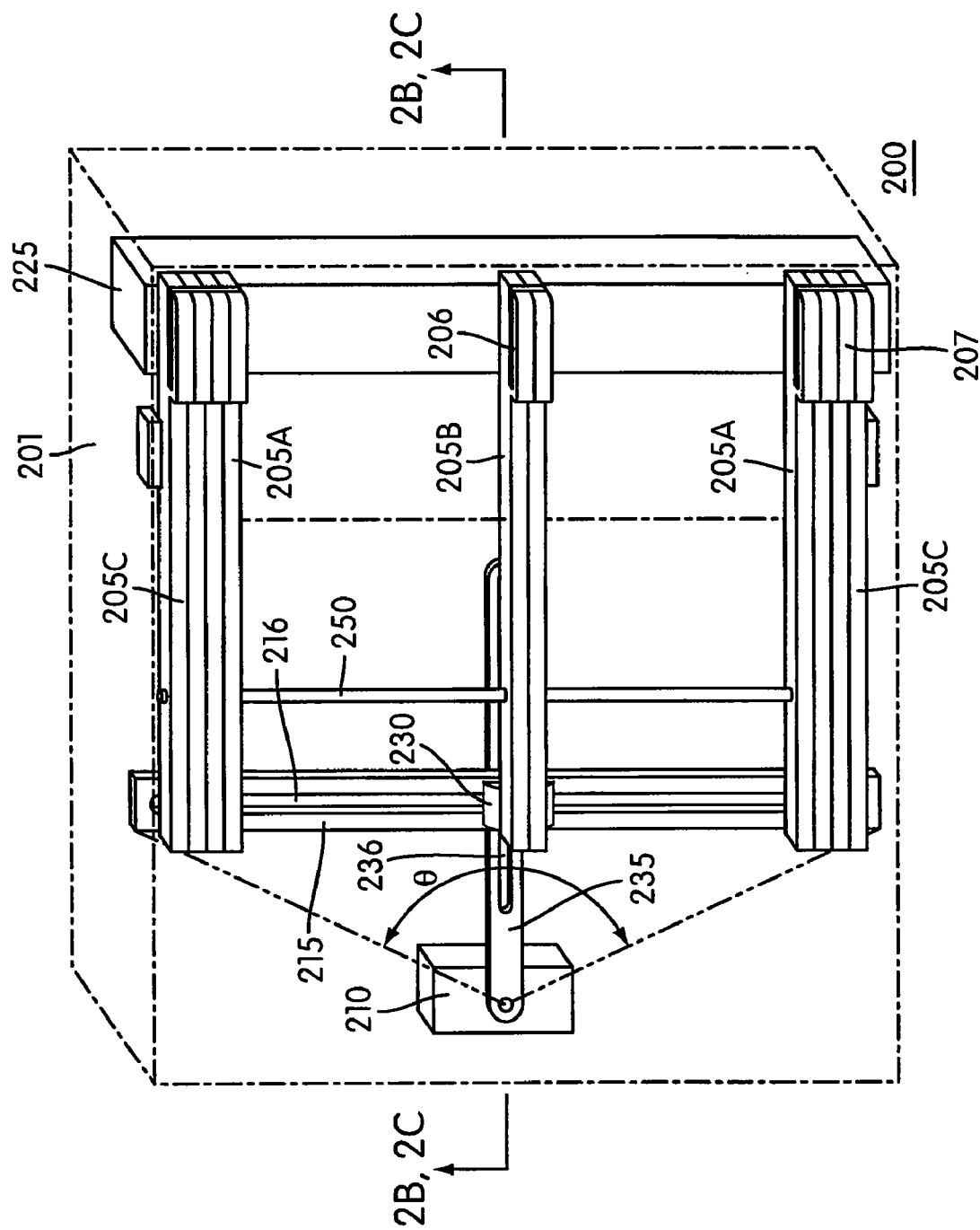
FIG. 2A is an illustrative example of one implementation of the tactile scrollbar system according to one embodiment of the present invention.
Figure 2B:
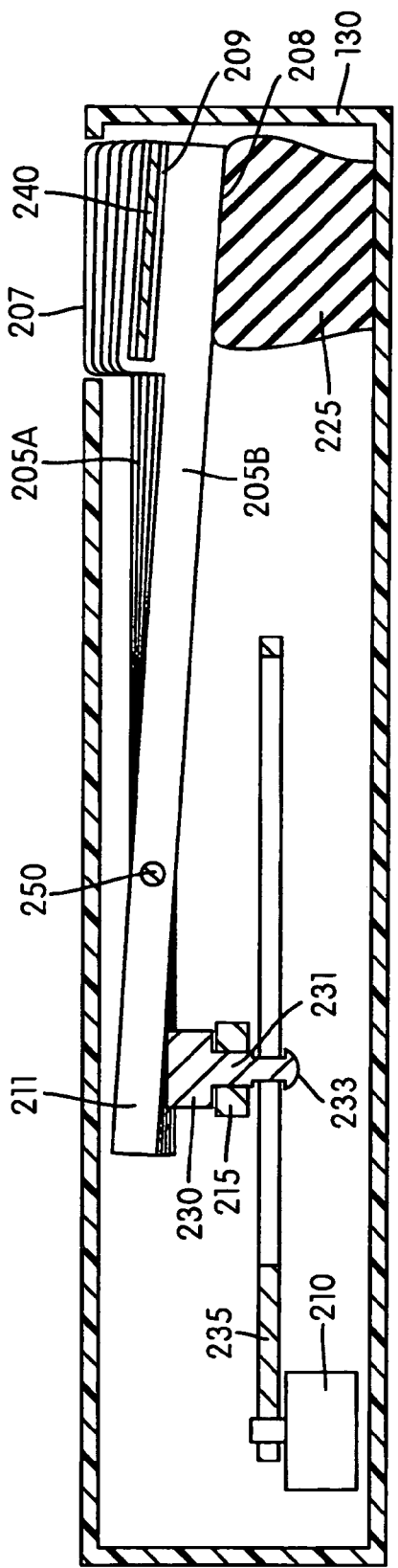
FIG. 2B shows a schematic cross-sectional view along 2B-2B of FIG. 2A.
Figure 2C:
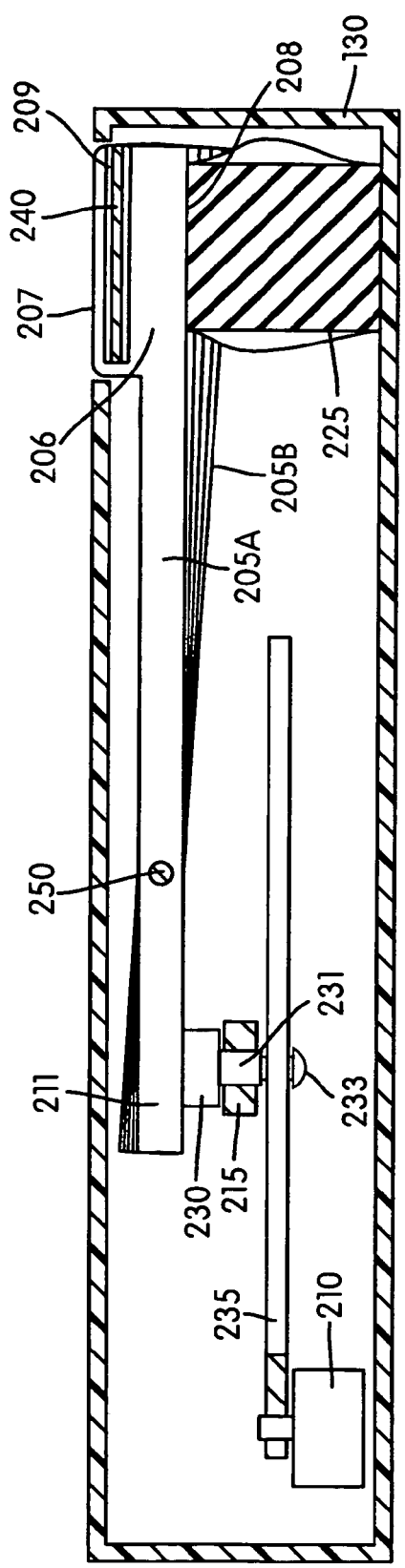
FIG. 2C shows a schematic cross-sectional view along 2C-2C of FIG. 2A taken a period of time after FIG. 2B and after a movement of the visible portion of the document.

As seen in FIGS. 2A-2C, the keys 205 include an enlarged head end section 206 on one side of the pivot bar 250 and a tail end 211 on the opposite side of the pivot bar 250 from the head end section 206. The head end of the keys 205 generally refers to the portion of the key 205 at the user interface section of the scrollbar. The head end section 206 includes an upper surface 207, a lower surface 208, and a slot 209.

The tail end 211 of the keys 205 may be defined as the longitudinally opposite portion of the keys 205. In an illustrative arrangement, the tail end 211 interacts with a key profile changing system. The keys 205 are pivotable so that they can be in a default position 205B of an alternative position 205A forming part of the changed profile contour region 125. The keys 205 may be made of thin strips of material such as plastic, copper, aluminum and/or steel.

The key profile changing system includes a profile changing block 230, a biasing device 225, and a profile changing block moving system. The profile changing block 230 will cause selected keys 205B to move from their default position to form the changed contour region 125. The biasing device 225 applies a force against the keys 205 to place them into their default position 205B. As can be seen in FIGS. 2A and 2B, one arrangement of a biasing device 225 includes an elongated compressible resilient strip. The biasing device 225 may be of any suitable material, such as a rubber or foam, providing the desired force to move the keys 205 into their default position 205B but will also yield a small distance in response to a user's downward force on the top surface 206 of a key 205 and to a force applied by the profile changing block 230 at the tail end 211 of the key 205 to change the profile.

As can be seen FIGS. 3A and 2B, the profile changing block 230 applies an upward force to the tail end 211 on a selected set of keys 205B to upwardly displace the tail ends 211 of those keys 205B. Since the keys 205 pivot about bar 250, this in turn, downwardly displaces the head end 206 of the selected keys 205B by a predetermined amount to form the changed contour region 125 as can be seen in FIGS. 3B and 2B.

The profile changing block 230 is movable in a direction parallel to the longitudinal direction of the scrollbar 120. More specifically, the profile changing block 230 is movable along a track 215 which is parallel to the longitudinal direction of the scrollbar 120. The profile changing block 230 is also coupled to a pivoting drive arm 235 that is driven by a motor 210. The profile changing block 230 is coupled to a slot 236 in the pivoting drive arm 235 and movable along a slot 216 in the track 215. This coupling arrangement may be accomplished by the structure shown in FIGS. 2B and 2C where a downwardly extending projection 231 extends through the slots 216 and 236 in the track 215 and the drive arm 235, respectively. A lock 233 in the form of a widened end section is positioned at the bottom of the downwardly extending projection 231 to maintain these coupling arrangements.

The motor 210 can cause the profile changing block 230, and thus the changed contour region 125, to appear at a desired location on the scrollbar 120. This occurs by the motor 210 pivotally moving drive arm 235 to a desired angular position or by a desired angle. When the drive arm 235 pivots, it applies a force on the downwardly extending projection 231 to push it linearly within the track 215 so that the profile changing block 230 is moved along the bottom of the tail ends 211 to the desired location along track 215. The profile changing block 230 pushes up on, and displaces the tail ends 211 of the selected keys 205B by selected amounts to cause the upper surfaces 207 to move down by amounts based on the profile of the block 230 and the relative distances of the pivot point 250 between the block 230 and the upper surfaces 207. The motor 210 moves the pivoting drive arm 235 in range of a motion θ which corresponds to the movement of the profile changing block 230 between the ends of the track 215 to form the changed contour region 125 at substantially both ends 121 and 122 of the scrollbar 120 and all points in between.

In one embodiment, the pivot bar 250 lies 1.5" from the head end of the keys 205 and the profile changing block 230 consists of a 0.5" long radiused metal piece. Other sizes, shapes and dimensions of the various components may also be used. Further, in that arrangement, the pivoting arm 235 is 3 inches in length and connects to a Futaba s3102 mini servo motor 210. Motor 210 may further be connected to a processing unit (not shown) that calculates a particular degree and direction of movement corresponding to specified location on the scrollbar 120.

FIG. 2B shows a cross-sectional view along section B-B of FIG. 2A. This embodiment illustrates the interaction between key 205B, pivot 250, profile changing block 230 and track 215. For instance, the top surface 207 of the tail end section 211 of key 205B is pushed upward by profile changing block 230. The upward motion of the tail end 211 causes key 205B to pivot on component 250 and consequently lowers the head end 206 to form the changed contour location 125 in the form of a contoured depression and to serve as a tactile indicator. As shown in FIG. 2C, key 205A, on the other hand, is not engaged by profile changing block 230 and thus, its upper surface 207 is in a default position due to biasing device 225 and may form a flat section of the top of the scrollbar 120.

Thus, it can be seen in part from FIGS. 3A and 3B that a desired contour on the upper surface of profile changing block 230 causes the opposite end of the affected keys 205B to have a corresponding inverse shape, although the amplitude of the affect may change based on the relative location of the pivot 250, the head end section 206 and the location of the applied force by the profile changing block 230. FIG. 3C shows an alternative arrangement having a projection formed by the head ends of affected keys 205B and it is recognized that the force applicator and biasing devices would be altered in the desired manner to achieve this arrangement.

It is recognized that the depicted arrangement is one suitable alternative to change the contour of the selected keys. For example, the biasing device could be placed at the tail end of the keys 205 between the keys 205 and the inside of the housing 130. Other biasing devices including counterweights or springs could also be used. Further, alternative devices could be used to move the profile changing block 230 such as a worm gear or a run of a belt conveyor.

Changed contour region 125 forms a physically contactable indicator that identifies the user's current location in the document 135. This arrangement permits the user to determine user's location with the sense of touch without requiring visual analysis or confirmation. For example, a changed contour region 125 may comprise a recess or protrusion of a particular section 125 of the scrollbar 120 allowing a user to sense the convex area with his or her finger(s).

With the formation of the changed contour region 125, the user can place his or her finger in it or against it, based on its profile, and apply a force. There are sensors, and in one arrangement isometric force (or pressure) sensors 252, that sense a horizontal component of that force. As shown in FIGS. 2A, 3A and 3B, adjacent the longitudinal end keys 205C, there may be isometric force sensors 252. When a horizontal force is applied to the changed contour region 125 in the direction of longitudinal axis of the scrollbar 120, an applicable sensor 252 senses the force applied on keys 205A, 205B & 205C, and in response can provide a desired command such as a scroll command. If desired, a single sensor may be used to determine forces in both directions. The control of the scrolling may be based on a time threshold, a force threshold, a combined time and force threshold, or on another desired threshold. Additionally, the scroll rate based on such an applied isometric force can be proportional to the amount of the force, and if desired, the scrolling can have an algorithm that accelerates based on the amount of time a threshold force is applied. In an illustrative arrangement, sensors 252 are FlexiForce 1-pound force-sensing resistors (FSRs). However, it is recognized that any number or type of sensors may be used.

A touch sensitive sensor is provided that extends along in the longitudinal direction of the scrollbar 120 that can sense the location and forces that can be applied by a user to the upper surface of the scrollbar. In one configuration, the sensor takes the form of a contact strip 240 and it is positioned in the slot 209 in the head ends 206 of the keys 205. The contact strip 240 may be composed of a touch-sensitive material similar those used in conventional touchpads for notebook computers and the like that is able to a downward force of a user's touch or finger movements. The touch sensitive contact strip 240 is preferably attached at one end to the housing, a subframe, or one of the end keys 205C, and the other end may remain unattached. This arrangement achieves an absolute location scrolling based on the location of the applied force if desired.

Touch-sensitive pads and strips are known in the art, such as the touch pad commonly found on many laptop computers. For example, a capacitive sensing technology for an elongated touch-sensitive pad is disclosed in U.S. Patent Application Publication No. 2003/0028346 A1, entitled "Capacitance Touch Slider," and filed Mar. 30, 2001 as U.S. patent application Ser. No. 09/820,747, which is hereby incorporated by reference herein as to its disclosure of touch-sensing technology. Contact strip 240 may utilize such known technologies such that it is sensitive to the physical touch of a stylus, such as a human finger or a man-made object such as a pen or other elongated pointer, against the touch-sensitive surface of tactile scrollbar 120.

The touch-sensitive sensing capabilities of contact strip 240 are configured to determine the position of a force applied relative to the tactile scrollbar 120. For example, where the contact strip 240 of tactile scrollbar 120 is elongated, the position of user contact may be determined and defined as a numerical coordinate position along the longitudinal axis of scrollbar 120, and the pressure, contact area, and/or other properties of the contact may further be determined.

As previously described, the touch sensitive contract strip 240 may be in a slot 209 in the head end section 206 of the keys 205. Further, in one arrangement, exactly one of the two longitudinal ends of the contact strip 240 may be affixed to the frame or to an end key 205C. The other end may be free to move but will remain in the slot 209 because of the arrangement. However, other configurations and relationships between the contact strip 240 and the keys 205 are possible. Thus, the touch sensitive contact strip 240 is usable for sensing but is shielded from environmental damage and is not exposed but its location within slot 209. Thus, application of a downward force to the top surface of one or more keys causes those discretely movable keys 205 to downwardly depress and top of the slot 209 to press against the top of the contact strip 240 and this force and location is sensed.

The tactile scrollbar 120 can navigate be used to navigate and scroll the electronic document 135 in many different manners. In one arrangement, the scrollbar 120 permits the combination of absolute positioning scrolling and isometric force input scrolling into one tactile scrollbar device. Additionally, the isometric mode may further allow users to adjust the rate of scrolling by altering the magnitude of force applied. Further, not only may the scrollbar provide a tactile indicator for determining location in a document, it also permits both fine and coarse scrolling through one device. Advantages of the scrollbar 120 are apparent in subsets of these capabilities as well as them in combination.

Figure 4A:
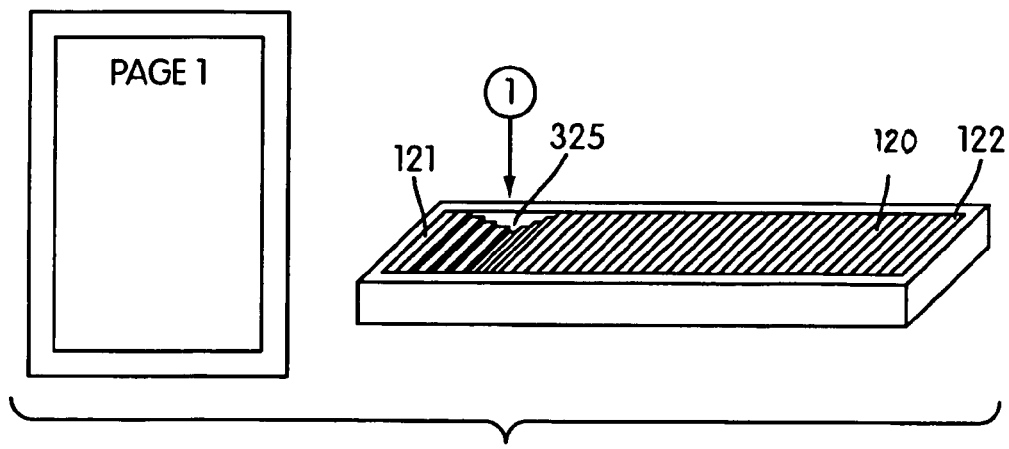
FIGS. 4A-4C illustrate the operation of the tactile scrollbar in a first navigation mode according to one embodiment of the present invention.
Figure 4B:
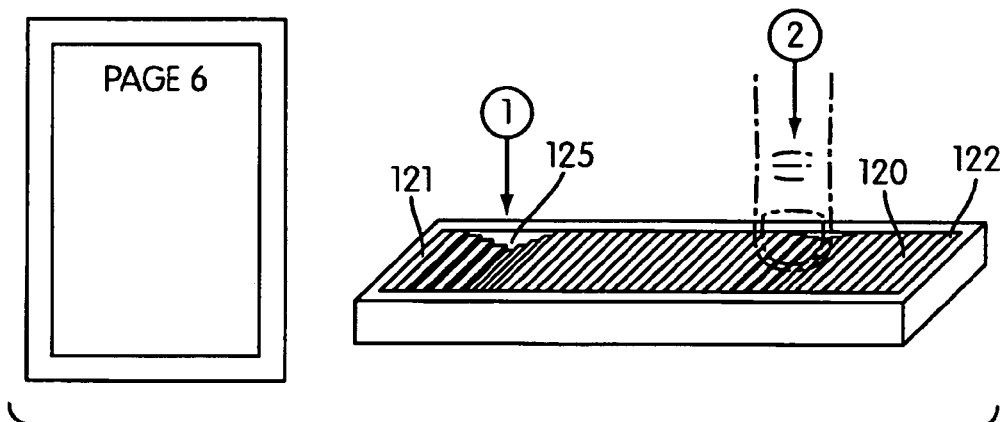
Figure 4C:
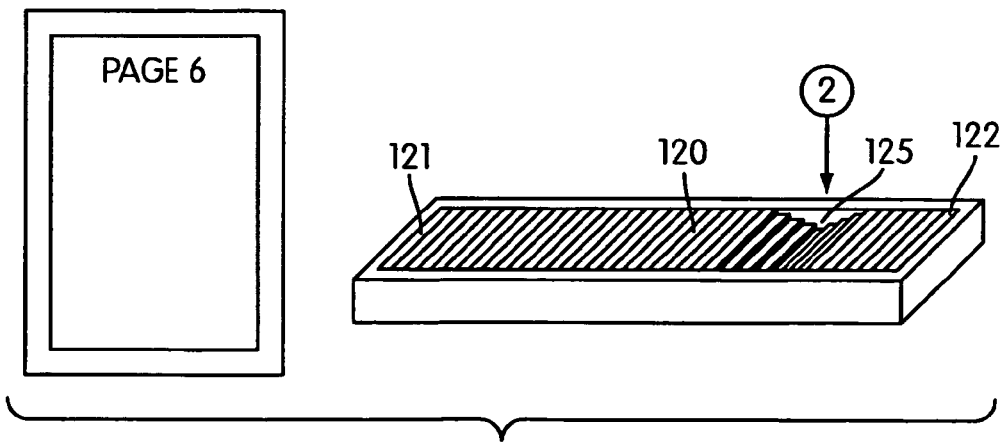

FIGS. 4A-4C illustrate a first navigation mode according to one embodiment of the present invention. In one aspect of the invention, isometric and isotonic modes of scrolling are provided into one scrolling device. FIGS. 4A-4C illustrate the operation of a tactile scrollbar 120 serving as an isotonic device being operated by a user applying a downward force, which in turn utilizing the absolute positioning capabilities of the scrollbar 120 according to an embodiment. In each of FIGS. 4A-4C, a visual display is schematically illustrated on the left along with a tactile scrollbar 120 on the left. In this illustration, a recess 325 is used as the profile of the changed contour region 125. However, it is recognized that other profiles could be used.

In FIG. 4A, the changed contour region 125 which also serves as a tactile indicator, rests at a first position indicated by the circled number 1 on scrollbar 120. The corresponding display image shows that the user's current position in the document is page 1. As can be seen, the changed contour region 125 is near the top 121 of the scrollbar 120 which would be expected if Page 1 of the electronic document is being viewed. The user may not feel that this particular section or page of the document is directly relevant to what she or he needs and would like to jump ahead to a page further along in the document. The user may then apply a downward force at circled position 2 on the scrollbar 120 as shown in FIG. 4B. This downward force is sensed via contact strip 240, interpreted by a controller. The controller would then send a signal to scroll the document or jump down in the document to Page 6 which would be the absolutely mapped position relative to the scrollbar 120. However, notice that when the user applies the force, the tactile indicator 125 initially remains at position 1. This gives the user the flexibility to continue navigation through the document by moving his or her finger along the scrollbar 120 until he or she finds the desired location. Once the user breaks contact with the tactile scrollbar 120, as shown in FIG. 4C, the tactile indicator 125, the controller will send a signal to the motor 210 to move the profile changing block 230 to a new appropriate position on the scrollbar 120 corresponding to page 6 of the document. In one arrangement, the new location is accepted as a valid scroll/jump to command after the force is applied for a time threshold. Alternatively, the tactile indicator 125 may track the user's finger movements and adjust regardless of whether or not the user has broken contact. Further, because forces on the top surfaces 207 of keys 205 are sensed, other gestures may be responsive to cause known scrolling/documents manipulation techniques. For example, flicking, double tapping, or a press/glide/hold gesture on the top surfaces of the keys 205 may be used to jump or scroll a predetermined amount in the document 135, such a page and/or a set number of lines, as these gestures would be sensed via contact strip 240 as well.

Figure 5A:
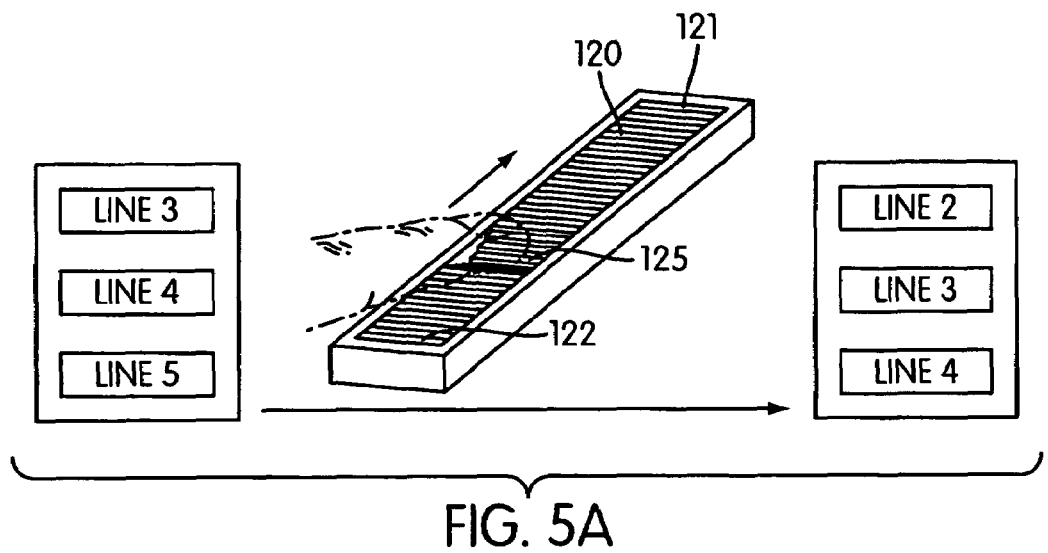
FIGS. 5A and 5B illustrate the operation of the tactile scrollbar in a second navigation mode according to one embodiment of the present invention.
Figure 5B:
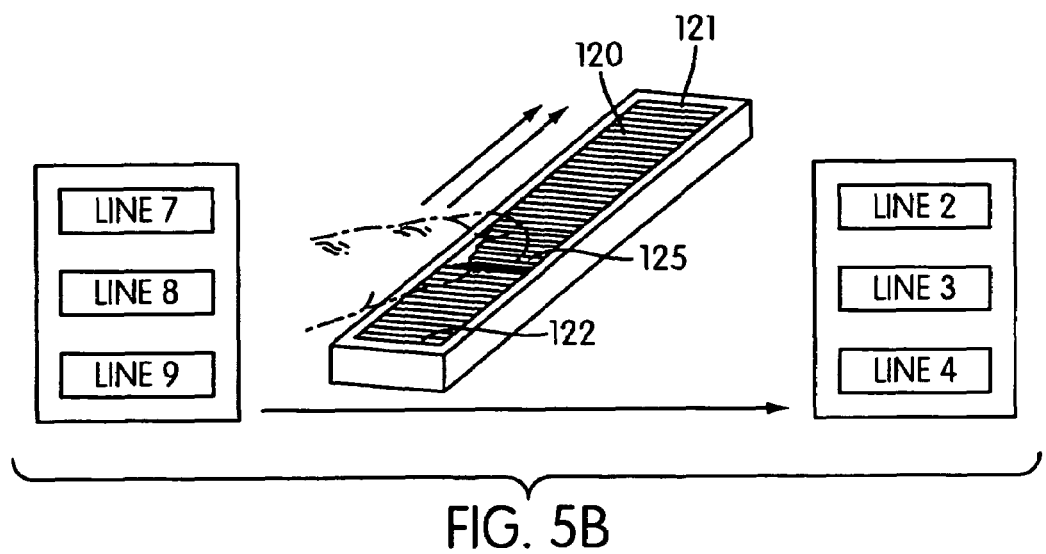

FIGS. 5A and 5B illustrate a second navigation method corresponding to isometric scrolling according to one embodiment of the present invention. In this illustration, the user is attempting to scroll at a finer scale (e.g. line-by-line) rather than the large jumps available through isotonic scrolling. This particular method of scrolling may be similar to the operation of a mouse wheel where the user may finely scroll by rotating the wheel and each "click" of the wheel usually corresponds to a predetermined number of lines in a document. However, rotation of the wheel of a conventional mouse does not normally permit scroll in larger increments than the predefined amount, e.g., one line per click. The isometric scrolling mode illustrated in FIG. 5 allows the user to interact with the tactile indicator 125 to achieve a variety of fine scrolling responses and complements the scrolling capabilities described with respect to FIGS. 4A and 4B.

In the example of FIG. 5A, the user is currently reading lines 3, 4 and 5 of a document in display image. However, he or she may want to scroll up a small amount, e.g., one or two lines. By applying a first level of force to the changed contour region/tactile indicator 125 on scrollbar 120 in the direction of desired document navigation, the horizontal component of that force is sensed by force sensor 252 and such may cause the document may scroll at a predetermined rate, for example 1 line/second. Thus, in the image, the document has scrolled to display lines 2, 3 and 4. Alternatively, and as shown in the example of FIG. 5B, a user may want to scroll faster than 1 line/second. To achieve faster rates of scrolling, the user may apply a second level of force greater than the first. The rate of scrolling may be calculated using various algorithms and equations using the magnitude of force as a primary variable. Thus, this second level of force may correspond to a rate of 5 lines/second resulting in the document moving up 5 lines as shown in display image. In other variations, increasing the magnitude of force may result in a slower rate of scrolling. The algorithm may also take time into account such as by increasing the scroll speed after predetermined time periods. Once the user has reached his or her desired location in the document and lifts his or her finger from the changed contour region/tactile indicator 125, the controller provides a command to the moving system for the profile changing block 230 so that the contour region/tactile indicator 125 is moved to a new position on the scrollbar 120 corresponding to the new position in the electronic document.

Figure 6A:
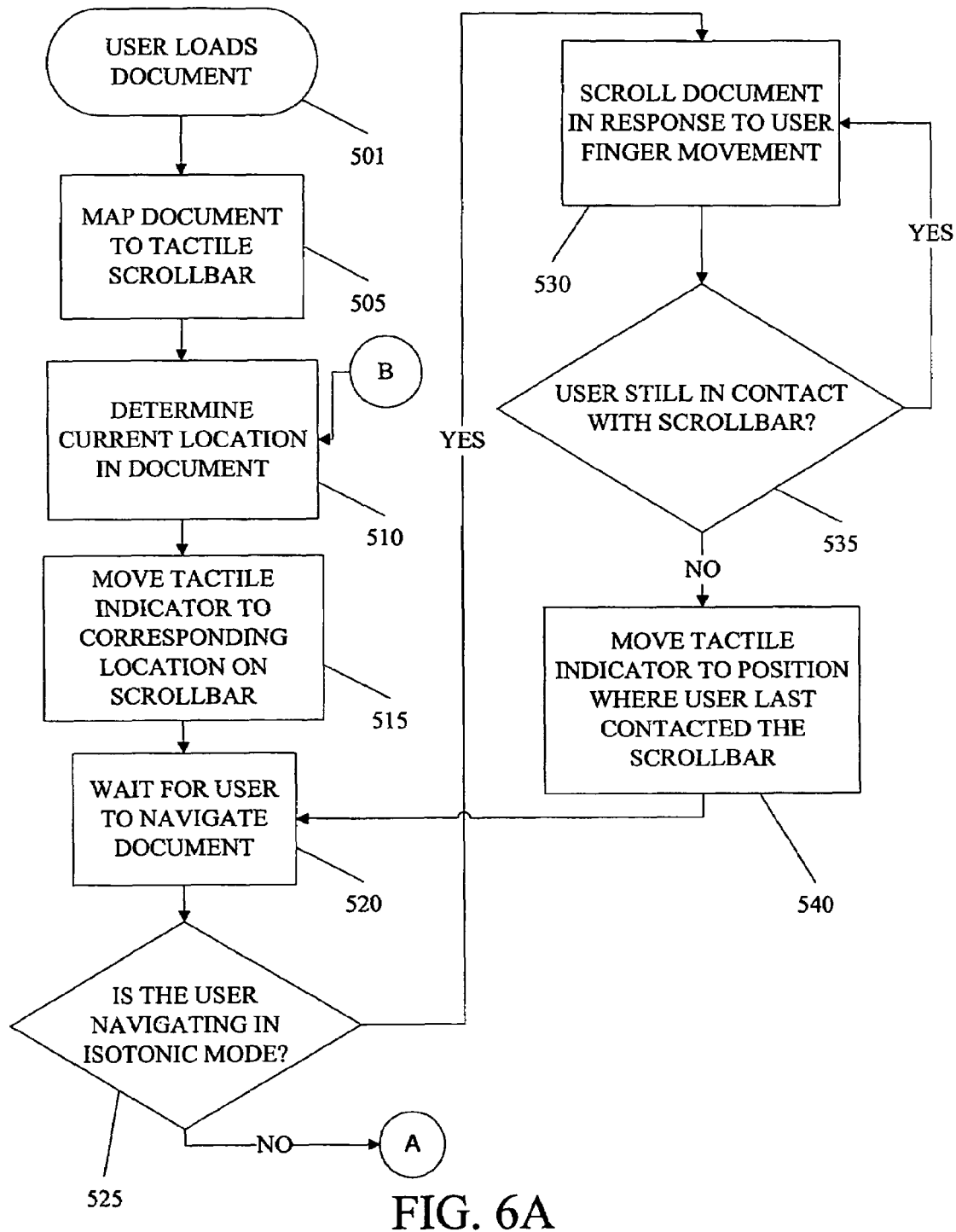
FIGS. 6A and 6B are flowcharts describing the modes of operation of the tactile scrollbar system according to one embodiment of the present invention.
Figure 6B:
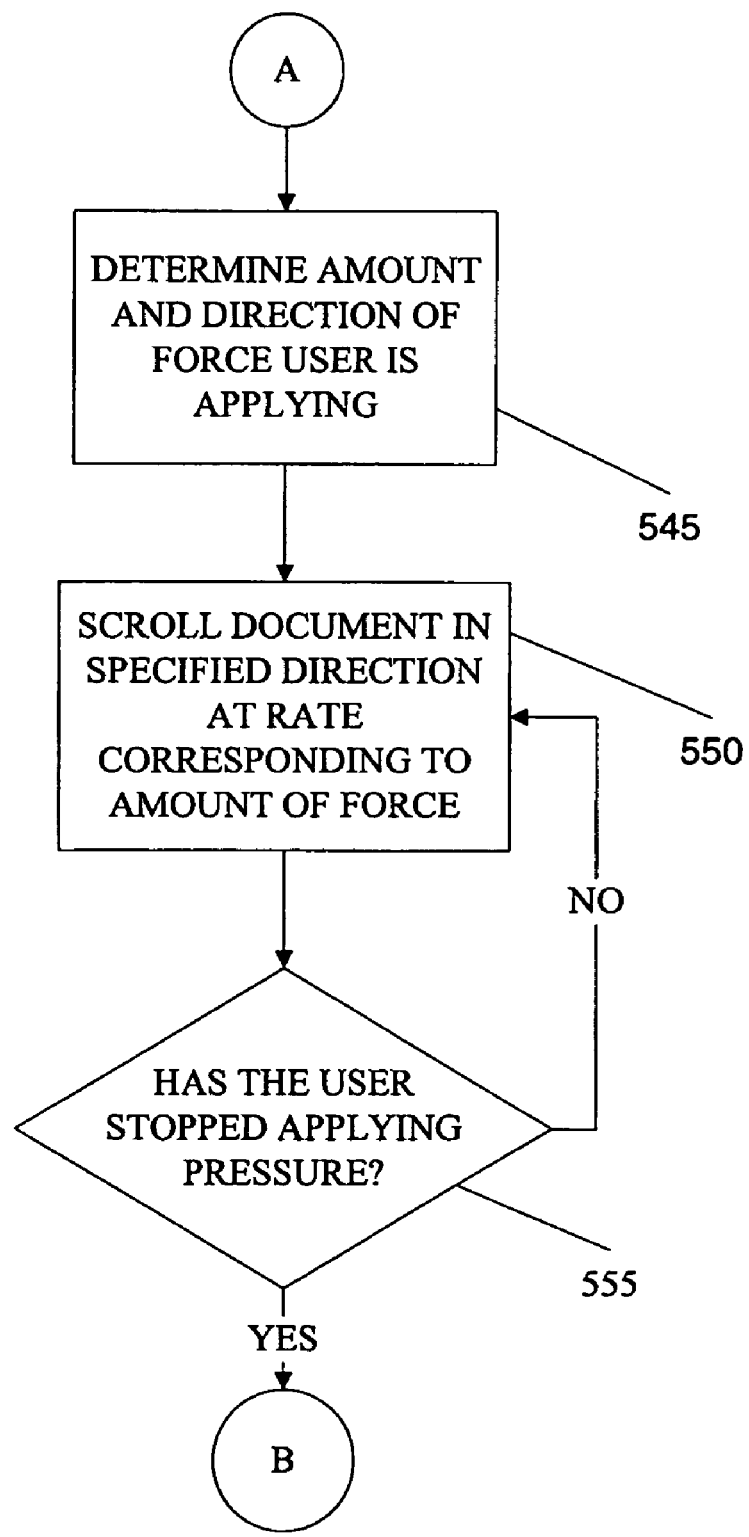

FIGS. 6A & 6B are flowcharts describing tactile scrollbar processing methods according to an illustrative embodiment of the present invention. In step 501, the user loads a document onto a display device, comprising the tactile scrollbar 120, using a display program. The display device may then map the document to the tactile scrollbar in step 505 to facilitate absolute/isotonic scrolling as well as position determination. The command program, acting as an intermediary between the mechanical controller and the display program, may subsequently determine the current position in the document according to step 510 and send this information to the hardware microcontroller mentioned previously with respect to FIG. 2. The microcontroller, in step 515, resolves the new scrollbar position according to the information received from the display device and converts it to a signal for the servo motor. The servo motor then moves the rotatable arm which consequently moves the tactile indicator.

Pursuant to step 520, the processing components for both the tactile scrollbar and display device wait for the user to engage in document navigation. Once the user has begun navigating, the microcontroller sends data relating to the user's interaction with the scrollbar to the command program. The command program, as described in step 525, then translates the received information and sends special commands to the display program for scrolling. In one example, if the program determines that the user is in fine scrolling mode, it will send out commands that mimic those sent to a computer from a mouse wheel. If the user is providing a force that is recognized as an isotonic command, the program may send instructions to scroll the document in response to the user's absolute finger movements (see step 530). In step 535, if the user is still in contact with the scrollbar, the document will continue to scroll relative to user's movement. Once the user has broken contact with the scrollbar, in step 540, the program will instruct the micro controller to move the rotatable arm to a new position so that the changed contour region 125 reflects the now displayed document position.

If, on the other hand, the command program determines the user has applied a potential force that is recognized as an isometric force for isometric scrolling, it will evaluate the amount and direction of force being applied in step 545. Applying certain equations and algorithms, the command program may then instruct the display program to scroll the document in the specified direction at a rate corresponding to the magnitude of applied force as in step 550. Once the user has stopped applying pressure (determined in step 555), the process returns to step 510 to determine current document location and to move the tactile indicator to a new position, if necessary.

A tactile scrollbar 120 as previously described and shown may be incorporated into alternative environments such as the keyboard 100' environment illustrated in FIG. 8. Thus, similarly, scrollbar 120 has a changed contour region 125, a top 121 and a bottom 122 and may be provided with structure, and function and operate as previously described. In the arrangement depicted in FIG. 8, the scrollbar 120 is laterally positioned with respect to the QWERTY section of the keyboard. However, the tactile scrollbar 120 can be in alternative locations on the keyboard 100' or used on other input devices.

Figure 9:
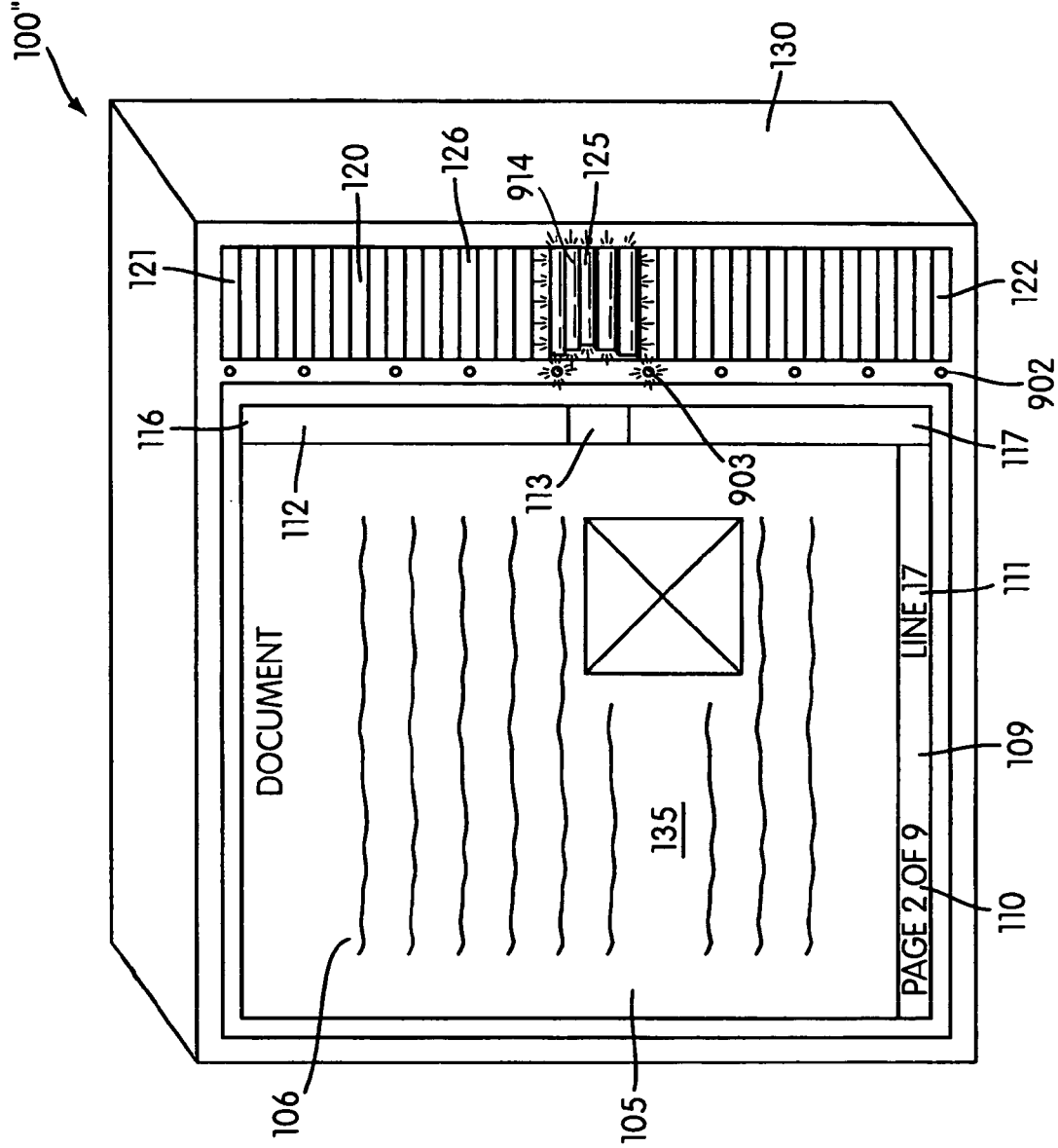
FIGS. 9 and 10 are similar to FIGS. 1 and 2B and further illustrate an illumination system providing a document position indicator.
Figure 10:
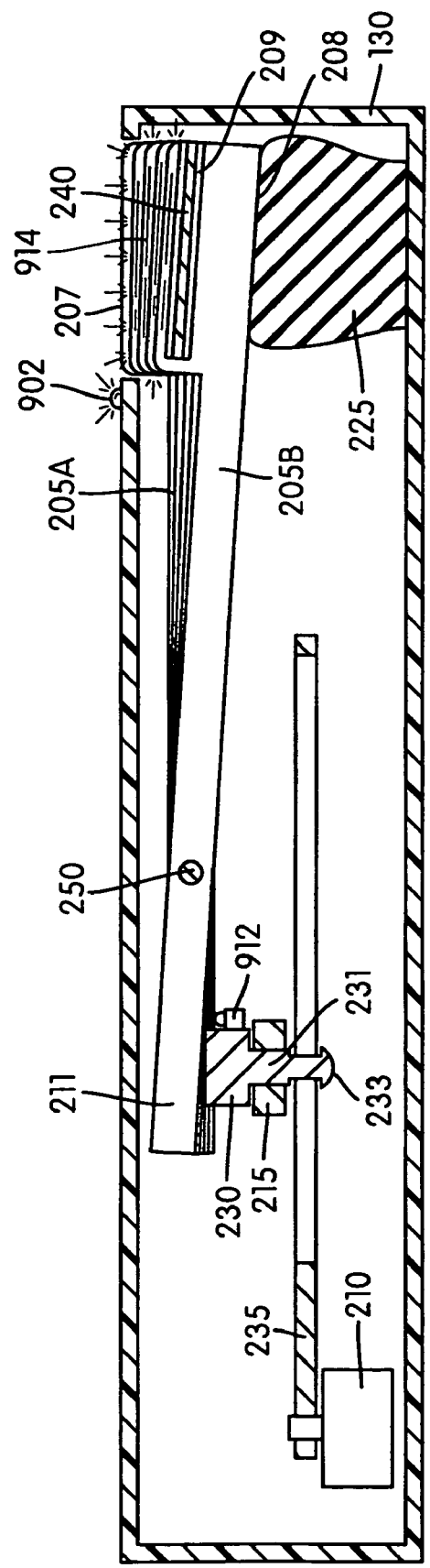

FIGS. 9 and 10 illustrate the tactile scrollbar 120 with illumination feedback in addition to the tactile feedback of the changed contour region 125. One arrangement, as illustrated includes a static illuminable feedback system and a movable illuminable feedback system. However, each provides effective illuminable feedback and may be incorporated without the other, and each and/or both may be provided to use light to provide a quick visual feedback generally corresponding to the current location of the document relative to the entire document. It is recognized that these illuminable feedback systems may be included regardless of the device that tactile scrollbar 120 is incorporated into, e.g., the E-Book device of FIG. 1 and/or the keyboard of FIG. 8. For simplicity of description, the device 100" used to explain these systems is the E-Book 100 of FIG. 1.

The static illuminable system may include a series of static light sources, such as LEDs 902. The static LEDs 902 are oriented in a line parallel to the longitudinal axis of the tactile scrollbar 120 and may be positioned adjacent to, or immediately adjacent, to the scrollbar 120 at a desired location such as on the housing frame immediately adjacent to the scrollbar 120.

The static LEDs 902 are coupled to the controller and can be controlled to be in one of varying multiple states. For example, in the most basic state, the static LEDs 902 can be controlled to be in an ON state or an OFF state. Alternatively, or in addition, power to the static LEDs 902 may be varied to an intermediate state to provide the illuminable LED 902 with an illumination state, such as a LOW LIGHT state that is not as bright as a fully ON state. In another condition, the illuminable LED 902 may be controlled to be in a BLINK state.

In operation, the static LEDs 902 are controlled such that the LED or LEDs 902 that are the closest to the current location of the electronic document 135 relative to the entire document are changed to have a state 903 that contrasts the state of the other LEDs that are farther from the document location. For example, in one arrangement, an LED 903 having a contrasting state may be in an ON state or a BLINK state while all or at least other static LEDs 902 in the line are in a different state such as an OFF state or a LOW LIGHT state. If desired, a third contrasting state may be used to distinguish the closest LED(s), the next adjacent LED(s), and the remainder of the LEDs. In an example of such an arrangement, an LED 903 closest to the mapped document location may have a first state such as an ON state, adjacent LEDs may be controlled to be in a LOW LIGHT state, while all or at least other static LEDs 902 in the line are in a different state such as an OFF state. In another arrangement, if the mapped document location falls equidistant between two LEDs, the two closest LEDs may have a contrasting state, such as LED 903, from the other LEDs 902. Similarly, other contrasting states may be used as well.

The LEDs 902 may also be multi-color LEDs and thus the lights may be illuminable in different color states such as RED, GREEN, and/or BLUE. Thus, for example, an LED 903 having a contrasting state may be in GREEN state while all or at least other static LEDs 902 in the line are in a different state such as a RED state. If desired, a third contrasting state may be used to distinguish the closest LED(s), the next adjacent LED(s), and the remainder of the LEDs. In an example of such an arrangement, an LED 903 closest to the mapped document location may have a first state such as an GREEN state, adjacent LEDs may be controlled to be in a BLUE state, while all or at least other static LEDs 902 in the line are in a different state such as an RED state. It is recognized that the multi-color LEDs may also be controlled to be in the BLINK and LOW LIGHT states to create a desired visual illumination feedback effect.

When the document position is changed, the states of selected LEDs 902 in the line of static LEDs 902 may be changed to continually provide accurate visual illuminated feedback corresponding to the current location of the document relative to the entire document.

The movable illuminable system may include a single light source, such as movable LEDs 912, shown in FIG. 10. The movable LED 912 may be coupled to the profile changing block 230 so that it is moved to shine light at the underside of keys 205 tilted by the profile changing block 230. The movable LED 912 may be configured to stay on for prolonged periods of time, such as whenever power is applied to the device 100", but the controller may be equipped to place it in a sleep mode if no activity has been sensed for a threshold period of time.

In this arrangement, the keys 205 are made from a transparent or translucent strip of plastic, such as Mylar or a Mylar variant. This makes the keys serve as light wave guides from the side of the keys 205 adjacent the movable LED 912 to the upper surface 207 at the enlarged head end section 206. Thus, location of the movable LED 912 relative to the top 121 and bottom 122 of scrollbar 120 causes the upper surface 207 of keys 205B forming the changed contour region 125 to have a different illumination level 914 such as by glowing and/or otherwise illuminating. Since the movable LED 912 is mounted to the profile changing block 230, the changed illumination sections 914 will always be located at least partially with location changed contour region 125. This provides illumination and tactile feedback on the keys corresponding to the current location of the document relative to the entire document.

Illustrative schematic block diagrams are shown in FIGS. 7A and 7B. FIG. 7A illustrates an embodiment where the scroll bar 120 and display 105 are mounted in a common housing, whereas FIG. 7B illustrates an embodiment where the display 105 and optionally a computing device that can run application programs are in one or more housings separate from the scroll bar 120 which may be incorporated in a computer input device like a keyboard.

Referring to FIG. 7A, all of the elements may be included in a common housing of a device 100, such an Ebook device. A processing unit including controller 950 is coupled to the display 105, the motor 210, the illumination members 902 and 912, the elongated contact strip sensor 240, the isometric force sensor(s) 252, and other input sensors 940 that may be associated with the device 100 such as depressible control buttons. This enables the controller 950 knowing the location of the viewed portion of document to change the state of the applicable static LEDs 902. Upon appropriate sensing by the elongated contact strip sensor 240 and/or the isometric force sensor(s) 252, the controller can process those sensing and move the document image and control the motor 210 to move the profile changing block 230. Moving the profile changing block 230 has the effect of moving the changed contour region 125 which now provides tactile feedback and illumination feedback. In one arrangement, the controller 950 may be a PIC 16f876 microcontroller which is able to calculate values for position, downward pressure, pressure along a row keys. This generated information may then be used to command and direct the navigation of a document on a display device.

FIG. 7B shows an example of a similar arrangement for when the scrollbar 120 is used as part of a computer input device for example. FIG. 7B differs from FIG. 7A in part in that a display 905 need not be part of the housing of device 100', and a processing unit having application program control capabilities 950b, such as a personal computer, can be coupled to both the display 905 and the device 100'. In this arrangement, a controller 950a may be contained within the housing of the keyboard or other computer input device. However, if desired, all of the controls may be incorporated external to the housing and the proceeding and controls can be accomplished by programs and controls in the personal computer.

Both types of sensors, capacitive antennas and force sensors, may be connected to digital logic and signal processing circuitry to transmit the detected and measured movements and forces.

The application of a tactile scrollbar having the features discussed herein may not be limited to simply document navigation. Another application may be using the tactile scrollbar in automobiles to allow drivers to determine through sense of feel how far they are from a particular location. As it stands right now, drivers must divert their visual attention from the road to check maps or navigation systems. Other applications such as gaming and multimedia programs may also benefit from such a device. The tactile scrollbar device may also be adapted to allow two dimensional position tracking.

While illustrative systems and methods embodying the present invention are shown by way of example, it will be understood, of course, that the invention is not limited to these embodiments. Modifications may be made by those skilled in the art, particularly in light of the foregoing teachings. For example, each of the features of the aforementioned embodiments and examples may be utilized in combination with other embodiments.

We claim:

1. A user engageable device for scrolling a document with respect to a display comprising: a tactile elongated scrollbar and an illuminable document position indicator associated with the scrollbar,
    wherein the elongated scrollbar includes pivotable translucent elements which act as light wave guides and a raising and lowering mechanism underlying a scrollbar interface layer for providing a mechanical feedback to a user regarding a current location in the document in form of at least one of the following: a ridge and a concave element; and
    wherein the elongated scrollbar further includes at least one isometric force sensor operative to provide mechanical feedback and to scroll the document according to a sensed position, speed, and pressure.

2. The user engageable device of claim 1, wherein the user engageable device is included as part of a keyboard with a housing having a top surface, the tactile elongated scrollbar is positioned on the top surface of the housing.

3. The user engageable device of claim 1, wherein the user engageable device is included as part of an electronic book device with a display and housing having a top surface, the tactile elongated scrollbar is positioned on the top surface of the housing.

4. The user engageable device of claim 1, wherein the illuminable document position indicator includes a plurality of static illuminable LEDs.

5. The user engageable device of claim 1, wherein the elongated scrollbar defines a longitudinal axis and the illuminable document position indicator includes a light source movable along an axis in a direction parallel to a longitudinal axis of the tactile elongated scrollbar.

6. The user engageable device of claim 1, wherein the tactile elongated scrollbar is configured to scroll the document at a first predetermined rate upon application of a first force and to scroll the document at a second predetermined rate upon application of a second force, the first and second predetermined rates being different and the first and second forces being different.

7. The user engageable device of claim 1, wherein upon application of a force, the tactile elongated scrollbar is configured to scroll the document at a first predetermined rate and to scroll the document at a second predetermined rate after a predetermined period of time, the first and second predetermined rates being different.

8. A user engageable device for scrolling an electronic document with respect to a display comprising:

a tactile elongated scrollbar defining a longitudinal axis, and means for producing illumination positioned at least on one of the scrollbar or adjacent the scrollbar generally corresponding to a relative position of the electronic document on the display, wherein the elongated scrollbar includes pivotable translucent elements which act as light wave guides and a lowering mechanism underlying a scrollbar interface layer for providing a mechanical feedback in form of a concave element to a user regarding a current location in the document; and wherein the elongated scrollbar further includes at least one isometric force sensor operative to provide mechanical feedback and to scroll the document according to a sensed position, movement speed, and pressure.

9. The user engageable device of claim 8, wherein said means for producing illumination includes a series of illuminable lights oriented parallel to the longitudinal axis.

10. The user engageable device of claim 9, wherein the illuminable lights include multi-color LEDs.

11. The user engageable device of claim 8, wherein said means for producing illumination includes a light source movable in a direction parallel to the longitudinal axis.

12. The user engageable device of claim 8, wherein said means for producing illumination includes both fixed and movable light sources.

13. A user engageable device for scrolling an electronic document with respect to a display comprising: a housing, an elongated scrollbar positioned on the housing, an illuminable document position indicator, and a controller configured to control the illuminable document position indicator, wherein the elongated scrollbar defines a longitudinal axis and the illuminable document position indicator includes a plurality of translucent elements positioned along the longitudinal axis, the translucent elements configured to act as light wave guides for light emanating from a movable light source, wherein the plurality of translucent elements are pivotable to change an upper contour of the scrollbar;

wherein the elongated scrollbar includes a raising and lowering mechanism underlying a scrollbar interface layer for providing a mechanical feedback to a user regarding a current location in the document in form of at least one of the following: a ridge and a concave element; and wherein the elongated scrollbar further includes at least one isometric force sensor operative to move the electronic document with respect to the display and cause the raising and lowering mechanism to provide the mechanical feedback according to at least one of a calculated value for position, downward pressure and speed of movement received by the isometric force sensor.

14. The user engageable device of claim 13, wherein said illuminable document position indicator includes a series of illuminable lights oriented parallel to a longitudinal axis and defined by the elongated scrollbar.

15. The user engageable device of claim 14, wherein the controller is configured to selectively illuminate and de-illuminate the illuminable lights based on a displayed location of the electronic document relative to a beginning and an end of the electronic document.

16. The user engageable device of claim 14, wherein the illuminable lights include multi-color LEDs, wherein the controller is configured to selectively change colors of the multi-color LEDs based on a displayed location of the electronic document relative to a beginning and an end of the electronic document.

17. The user engageable device of claim 13, wherein the illuminable document position indicator includes a plurality of static light sources.

18. The user engageable device of claim 13, wherein the illuminable document position indicator includes the movable light source.

19. The user engageable device of claim 13, further comprising a second illuminable document position indicator including a plurality of static light sources.

\* \* \* \* \*